UNBALANCED RING DEMODULATOR CIRCUIT

INVENTOR.
HAROLD E. ROBB, JR.
BY
Byron, Hume, Groen & Clement
ATTYS.

June 20, 1967 H. E. ROBB, JR 3,327,135

UNBALANCED RING DEMODULATOR CIRCUIT

Filed Aug. 23, 1963 2 Sheets-Sheet 2

INVENTOR.
HAROLD E. ROBB, JR.

BY

Byron, Hume, Groen & Clement
ATTY'S.

United States Patent Office 3,327,135

Patented June 20, 1967

3,327,135

UNBALANCED RING DEMODULATOR CIRCUIT

Harold E. Robb, Jr., Elk Grove Village, Ill., assignor to The Powers Regulator Co., Skokie, Ill., a corporation of Illinois Filed Aug. 23, 1963, Ser. No. 304,186

5 Claims. (Cl. 307—88.5)

The present invention relates to circuits and, in particular, to an unbalanced ring demodulator circuit.

It is an object of the present invention to provide an unbalanced ring demodulator circuit.

It is another object of the present invention to provide a demodulator circuit that produces an output signal corresponding to the relative phase and amplitude of an input signal.

It is yet a further object of the present invention to provide an unbalanced ring demodulator having substantially reduced power requirements.

Still another object of the present invention is to provide an unbalanced ring demodulator including components that are required to have operating ranges substantially less than comparable components in a balanced ring demodulator.

A more finite object of the invention is to provide a demodulator circuit which is relatively low cost in construction and reliable in operation.

A demodulator circuit embodying the features of the present invention functions to compare an input signal with a reference signal and produce an output signal which is a function of the phase and amplitude of the input signal. When in a normal or quiescent state, the demodulator circuit produces an output voltage of preselected amplitude and in this sense embodies a shifted characteristic curve. As a result, the amplitude of the applied input signal need be only one-half of that applied to a normal ring demodulator in order to produce an output signal of corresponding magnitude. To this end, operating ranges of the demodulator circuit of the present invention need be only one-half of that required in a balanced demodulator circuit.

Other objects and advantages of the present invention will become apparent from the following description of one preferred embodiment thereof when considered in conjunction with the accompanying drawings wherein.

Figure 1:
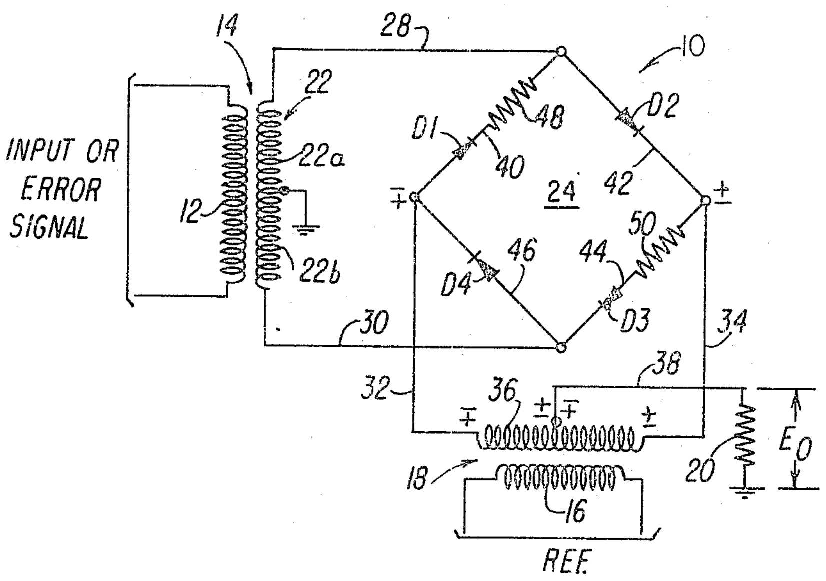
FIGURE 1 is a schematic view of an unbalanced ring demodulator circuit embodying the features of the present invention.

FIGURE 1 illustrates a preferred embodiment of a demodulator circuit which is generally designated by the numeral 10 and which incorporates the features of the present invention. Quite generally, the demodulator circuit 10 functions to compare an alternating current input signal with a suitable reference signal and produces an output signal corresponding to the relative phase and amplitude of input signal. The input signal supplied to the circuit 10 is developed across a primary winding 12 of an input transformer 14, and the reference signal is developed across the primary winding 16 of a transformer 18.

The input signal supplied to the input transformer 14 is coupled through the primary winding 12 to a center tapped secondary winding 22. The center tap of the secondary 22 is grounded to provide a first winding **22*a* and a second winding 22*b*. The windings 22*a* and 22*b* are connected across one diagonal of a ring-type bridge network 24 by suitable conductors 28 and 30 so that an input signal supplied to the circuit 10** is applied across this diagonal.

As shown in FIGURE 1, the reference signal is applied across the other diagonal of the bridge network 24. In this connection, conductors 32 and 34 connect the ends of a center tapped secondary winding 36 of the transformer 18 to this other diagonal of the bridge network 24. The center tap of the secondary winding 36 is connected by way of a conductor 38 to ground through a load resistor 20, across which is developed the output voltage.

With the circuit arrangement generally described above, the output voltage developed across the load resistor 20 is a composite signal that reflects the relative phase and amplitude differences between the applied input and reference signals. More particularly, when no input signal is supplied to the bridge network, an output signal is normally developed across the load resistor 20 due to the application of the reference signal to the selectively unbalanced bridge as hereinafter described. To facilitate obtaining an output signal that consistently reflects the relative phase and amplitude differences between the input and reference signals, the reference signal supplied to the circuit 10 is preferably selected to have a magnitude greater than that of the anticipated input signals that are supplied to the circuit.

The selectively unbalanced operation of the bridge network 24 and the advantages stemming from such operation shall now be fully described. The bridge network 24 includes four bridge arms 40, 42, 44 and 46. Each of these arms preferably includes a semiconductor rectifier or diode. The diodes which are designated $D_1$, $D_2$, $D_3$, and $D_4$, are connected in the arms 40, 42, 44 and 46, respectively, so that under approprate biasing conditions conventional current flow through portions of the bridge network is in a counterclockwise direction. As shown in FIGURE 1, the junction of the arms 40 and 42 is connected to the conductor 28, and the junction of the arms 44 and 46 is connected to the conductor 30. Similarly, the junction of the arms 40 and 46 is connected to the conductor 32, and the junction of the arms 42 and 44 is connected to the conductor 34.

Selective bridge unbalance in accordance with the present invention is achieved by connecting resistors in selected ones of the bridge arms. In the illustrated embodiment, the oppositely disposed arms 40 and 44 include unbalancing resistors. That is, an unbalancing resistor 48 is connected in the bridge arm 40 in series with the diode $D_1$, and a resistor 50 is serially connected to diode $D_3$ in the arm 44.

The resistors 48 and 50 may have a fixed impedance value or may be variable resistors which facilitate the adjustment of the magnitude of the quiescent output signal developed across the load resistor 20. Moreover, it should be understood that other unbalancing arrangements can be employed, in which case the quiescent output voltage which is produced with no input signal applied to the bridge network would have a polarity opposite to that which is produced when employing the illustrated unbalancing arrangement.

The unbalanced bridge network 24 is arranged so that the diodes employed in the bridge arms thereof rectify the input and reference signals when both are applied to the bridge and thereby produce a composite output signal across the load resistor 20. However, in the absence of an applied input signal, only the reference signal contributes to the production of an output signal, and this so called quiescent output signal is designated $E_A$ in FIGURE 9. As outlined above, the quiescent magnitude of the output voltage $E_A$ can be varied by effecting corresponding variations in the values and/or location of the unbalancing resistors connected in the arms of the bridge network 10.

Figure 2:
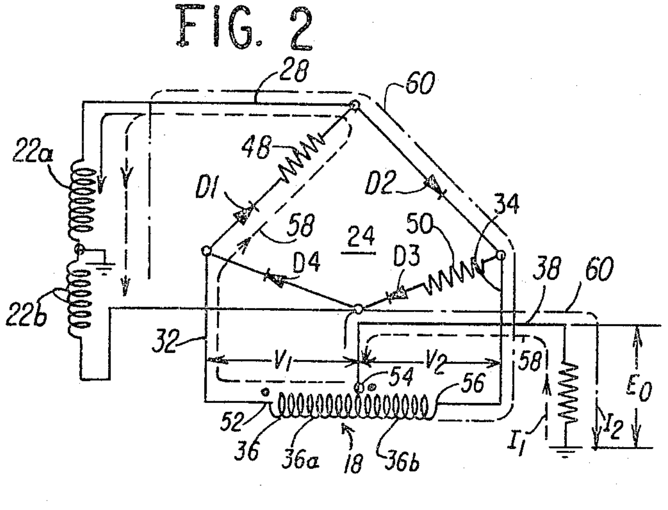
FIGURE 2 is a fragmentary schematic view of the circuit of FIGURE 1 depicting the conductive state of the circuit during one half cycle of operation with only the reference signal supplied thereto.
Figure 4:
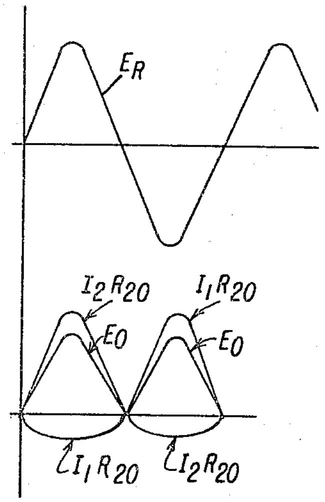
FIGURE 4 is a graphical illustration of the applied reference signal and the composite output signal produced by the circuit under the operating conditions depicted FIGS. 2 and 3.
Figures 3, 5:
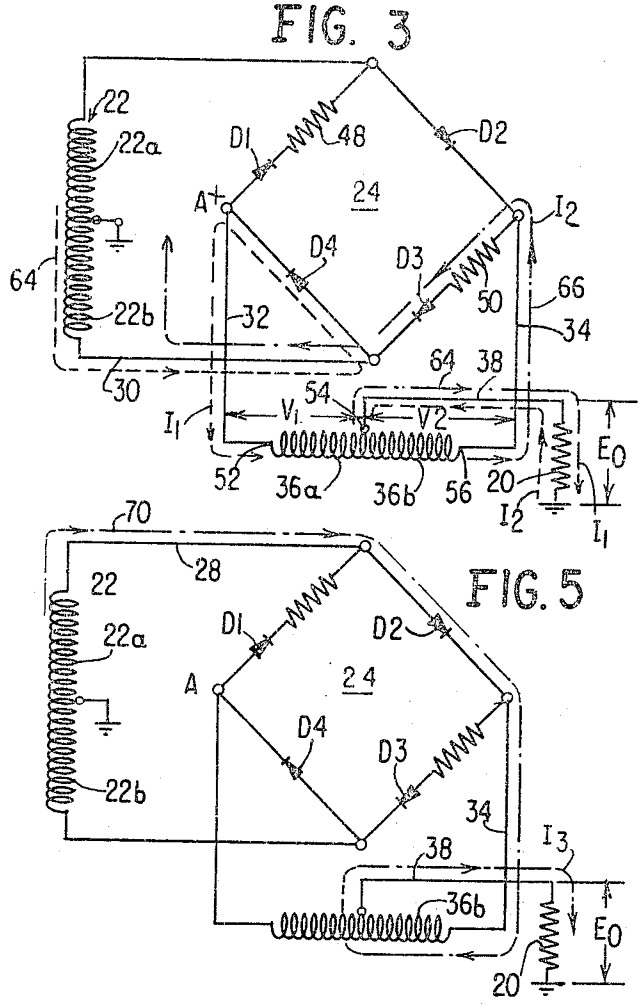
FIGURE 3 is a fragmentary schematic view similar to FIGURE 2 and depicting the conductive state of the circuit under similar operating conditions but during the next half cycle of the applied reference signal.
FIGURE 5 is a fragmentary schematic view depicting the conductive state of the circuit during one half cycle of operation and with both a reference signal and an in-phase input signal supplied thereto.

The manner in which the quiescent output voltage $E_A$ is produced during alternate half cycles of the applied reference signal will be appreciated from a consideration of FIGS. 2–4. The reference signal normally coupled to the bridge network 24 is graphically illustrated in the upper portion of FIGURE 4 and is designated $E_R$. This signal, when applied to the primary winding 16 induces voltages $V_1$ and $V_2$ across the windings **36*a* and 36*b***, respectively.

During one half cycle of the applied reference signal (i.e., corresponding to the circuit conditions depicted in FIGURE 2) the potential applied to the conductor 32 at one end of the secondary winding 36 is positive with respect to the center tap, and the potential applied to the conductor 34 is negative with respect to the center tap. Under these conditions and with no input signal developed across the center tapped secondary winding 22, only the diodes $D_1$ and $D_2$ are forward biased.

More particularly, the voltage $V_1$ that is applied across a portion of the bridge network 24 results in the diode $D_1$ becoming forward biased and effects the flow of current, which is designated $I_1$, through that portion of the bridge network 24 indicated by the dotted line 58. This path for conventional current can be traced from ground through the resistor 20, the conductor 38, the winding **36*a*, the conductor 32, the diode $D_1$, the resistor 48, the conductor 28, and through the winding 22*a*** back to ground.

Similarly, the voltage $V_2$, which effects the forward biasing of the diode $D_2$, results in the generation of the current $I_2$ which flows through that portion of the circuit as designated by the dot-dash line 60. This path for conventional current can be traced from ground through the winding **22*a*, the conductor 28, the diode $D_2$, the conductor 34, the winding 36*b*, the conductor 38, and through the load resistor 20** to ground.

Since the currents $I_1$ and $I_2$ flow through the load resistor 20 in opposite directions, the output voltage, $E_o$, is a composite voltage represented by $R_{20}\ (I_2-I_1)$. Moreover, inasmuch as the path for $I_1$ includes the additional unbalancing resistor 48, the current $I_2$ is of greater magnitude and therefore dictates the polarity of the output signal as shown in FIGURE 4.

The conductive state of the demodulator circuit 10 during the next half cycle of the applied reference signal is illustrated in FIGURE 3. During this next succeeding half cycle, the voltages $V_1$ and $V_2$ are of opposite polarity and only the diodes $D_3$ and $D_4$ are forward biased. The voltage $V_1$ results in the generation of the current $I_1$ which flows in the path identified by the dotted line 64 and including the diode $D_4$. On the other hand, the current produced by the voltage $V_2$ flows in the path indicated by the dash-dot line 66 and including the serially connected diode $D_3$ and the unbalancing resistor 50.

As in the case of the first half cycle of the applied reference signal, the voltage $E_o$ is a composite voltage having a magnitude corresponding to $R_{20}\ (I_1-I_2)$; however the current $I_1$ dictates the polarity of this output voltage as shown in FIGURE 4. From a consideration of the foregoing with reference to FIGS. 2–4, it will be appreciated that the magnitude and polarity of the output viltage $E_o$ is the same during alternate half cycles of the applied reference voltage $E_R$. In the absence of an applied input signal, the output voltage $E_o$ corresponds to the quiescent operating voltage $E_A$ which is graphically depicted in FIGURE 9 and which may, for example, have a magnitude of 10 volts.

Figure 6:
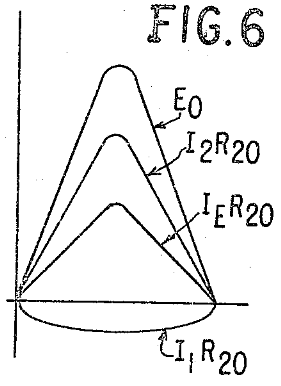
FIGURE 6 is a graphical illustration of the composite output signal produced by the circuit under the operating conditions depicted in FIGURE 5.

The operation of the circuit 10 with both a reference signal and an in-phase input signal applied thereto will best be appreciated from a consideration of FIGS. 5 and 6. During one half cycle of these applied signals, the conductive state of the unbalanced demodulator circuit is such that only the diodes $D_1$ and $D_2$ are forward biased. Under these biasing conditions, current flow in the bridge network 24, which is attributable to the voltages $V_1$ and $V_2$, corresponds to that described in connection with FIGURE 2 during the initial half cycle of the applied reference signal. In addition, current $I_3$ due to the applied input signal contributes to the composite output voltage. The path for this current flow is designated by the dot-dash line 70 and includes the forward biased diode $D_2$. Since each of these generated currents $I_1$, $I_2$ and $I_3$ flow through the load resistor 20, the output voltage $E_o$, is a composite output signal equal to $R_{20}\ (I_2+I_3-I_1)$ as depicted in FIGURE 6.

Although only the first half cycle of the applied input and reference signals is depicted, it should be understood that the composite output signal $E_o$ produced during the subsequent half cycle is identical to that illustrated in FIGURE 6 but is represented by the equation $$R_{20}(I_1+I_3-I_2)$$

As described above, the components of the output voltage attributable to $I_1$ and $I_2$ are reversed in polarity during this subsequent half-cycle, but because of the relative magnitudes thereof, the composite output signal is the same during successive half cycles of the applied signals.

Figure 9:
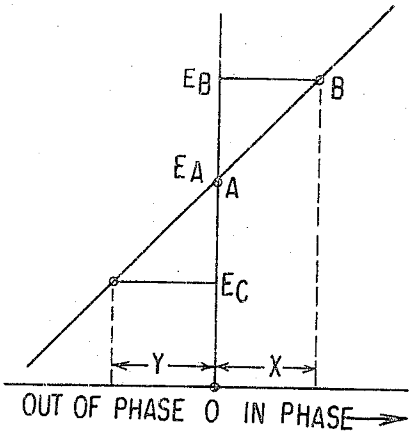
FIGURE 9 is a graphical illustration of the characteristic curve for the circuit shown in FIGURE 1 where the quiescent operating point is selectively adjustable to yield any desired "off zero" null point.

Accordingly, for an in-phase input signal having a peak to peak magnitude of X volts, the composite output signal $E_o$ increases from the quiescent value $E_A$ to a value $E_B$, as illustrated in FIGURE 9. As the magnitude of the in-phase input signal increases, the amplitude of the composite output signal proportionately increases in a positive direction. Conversely, if the magnitude of the in-phase input signal decreases, the composite output signal will have a magnitude less than $E_B$ but greater than the quiescent value $E_A$.

Figure 7:
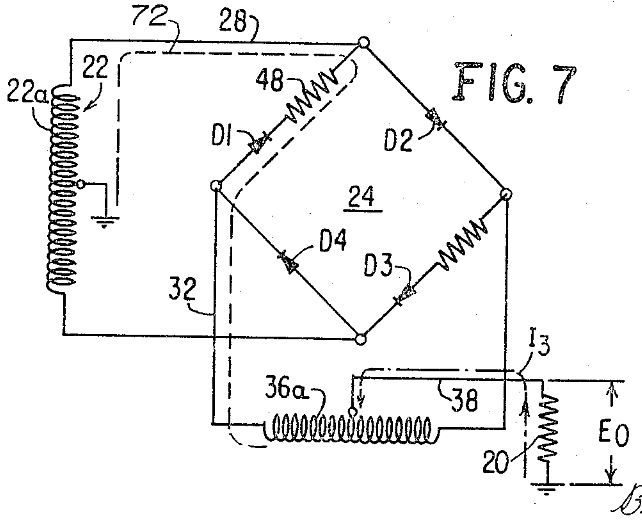
FIGURE 7 is a fragmentary schematic view similar to FIGURE 5 but depicting the conductive state of the circuit during one half cycle of operation with both the reference signal and an out-of-phase input signal supplied thereto.

The situation wherein the input signal is out-of-phase with respect to the reference signal will now be considered, and, for purposes of illustration the phase difference will be assumed to be 180°. In such a case, the output signal voltage $E_o$ is again a composite of the input signal and the reference signal i.e. it is produced by $I_1$, $I_2$, and $I_3$. The current attributed to the out-of-phase input signal flows in the path illustrated by a dot-dash line 72 in FIGURE 7, and current flow due to $V_1$ and $V_2$ corresponds to that described in connection with FIGS. 2 and 5. Under the biasing conditions depicted in FIGURE 7, the diodes $D_1$ and $D_2$ are conducting. However, the current $I_3$ flows in a direction opposite to that produced by an in-phase input signal.

Figure 8:
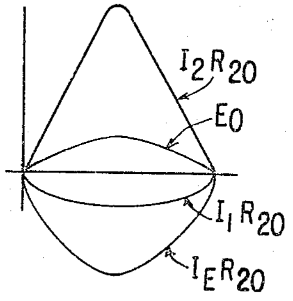
FIGURE 8 is a graphical illustration of the composite output signal produced by the circuit under the operating conditions depicted in FIGURE 7.

The voltage components contributing to the output voltage signal $E_o$ under these circuit conditions are illustrated in FIGURE 8. Because of the relative magnitudes of these voltage components, the output signal $E_o$ is positive, but has an amplitude less than the amplitude of the quiescent output voltage $E_A$ (i.e. corresponding to the voltage $E_C$ in FIG. 9).

From the foregoing, it will be appreciated that the output voltage from the demodulator circuit 10 yields an accurate indication of the relative phase and magnitude of the applied input signal. For example, when the input signal is in-phase with the reference signal, the output voltage has a magnitude greater than the quiescent output signal. On the other hand, when the input signal is out-of-phase with the reference signal, the output voltage has a magnitude less than the magnitude of the quiescent output signal. The positive or negative polarity of the quiescent output voltage is determined by the placement of the unbalancing resistors 48 and 50, as previously described.

It should be understood that the foregoing description of a preferred embodiment of an unbalanced demodulator circuit is simply illustrative of the invention. Various modifications of the circuitry can be devised by one skilled in the art without departing from the invention as set forth in the accompanying claims.

What is claimed is:

1. An unbalanced ring demodulator circuit which comprises a bridge arrangement having four branches, a unilateral current conducting means in each of said branches and oriented to conduct current in one direction, a first impedance means serially connected to one of said current conducting means in one of said branches, a second impedence means serially connected to another of said current conducting means in a branch opposite to said one branch, said impedance means effecting a normal unbalance in said bridge arrangement to cause said demodulator circuit to operate off equilibrium so as to yield a quiescent output voltage signal, means connected to said bridge arrangement for supplying a reference signal thereto, means connected to said bridge arrangement for supplying an input signal thereto, and load means connected to said bridge arrangement so that an output signal is developed thereacross which is related to the relative phase and amplitude of said input signal when applied to said bridge arrangement and which is related to the degree of unbalance of said bridge arrangement with no input signal applied thereto.

2. In an unbalanced ring demodulator circuit of the type including means for supplying respectively a reference signal and an input signal, a bridge arrangement having four branches electrically connected together, unilateral current conducting means connected in each of said branches such that current is adapted to be conducted in one direction around said bridge arrangement, impedance means respectively connected in a pair of opposite branches of said bridge arrangement so as to be respectively serially connected with the unilateral current conducting means in said pair of branches, said impedance means causing said bridge arrangement to be unbalanced and to operate at a point off equilibrium so as to produce a quiescent output signal in the absence of an applied input signal, and load means connected to said bridge arrangement and across which is developed an output signal having an amplitude and polarity corresponding to the magnitude and phase of the input signal when applied to said bridge arrangement and which is related to the degree of unbalance of said bridge arrangement with no input signal applied thereto.

3. An unbalanced ring demodulator circuit which comprises a bridge arrangement having four branches, a unilateral current conducting means in each of said branches and oriented to conduct current in one direction, impedance means connected in a pair of opposite branches of said bridge arrangement so as to be serially connected with the unilateral current conducting means in each of said branches, said impedance means causing said bridge arrangement to be unbalanced and to operate off equilibrium so as to yield a quiescent output voltage signal, means connected to said bridge arrangement for supplying a reference signal across a first diagonal thereof, means supplying an input signal across a second diagonal of said bridge arrangement, and load means connected in circuit with said bridge arrangement so that an output signal is developed thereacross which has a magnitude and polarity corresponding to the relative magnitude and phase of the input signal when applied to said bridge arrangement and which is related to the degree of unbalance of said bridge arrangement with no input signal applied thereto.

4. The demodulator circuit of claim 3 wherein each of said supplying means is a transformer having a center-tapped secondary winding and wherein said load means is connected between the center-taps of the secondaries of said transformers.

5. An unbalanced ring demodulator circuit which comprises a bridge arrangement having four branches, a unilateral current conducting means in each of said branches and oriented to conduct current in one direction, a first impedance means serially connected to one of said current conducting means in one of said branches, a second impedance means serially connected to another of said current conducting means in a branch opposite to said one branch, said impedance means effecting an unbalance in said bridge arrangement to cause said demodulator circuit to operate off equilibrium so as to yield a quiescent output voltage signal, first and second transformers having primary windings adapted to be connected respectively to alternating current voltages and, further, having center-tapped secondary windings respectively connected across different diagonals of said bridge arrangement, and output means interconnecting the center-taps of said secondary windings for producing an output signal responsive to the relative phase and magnitude between the alternating current voltages applied to the primary windings of said transformers when two such voltages are applied to said primary windings and for producing an output signal indicative of the degree of unbalance of the bridge arrangement when only an alternating current reference voltage is applied to the primary windings of one of said transformers.

References Cited

UNITED STATES PATENTS

| | | | |
|---|---|---|---|
| 2,728,042 | 12/1955 | Ruhland | 307—88.5 |
| 2,774,932 | 12/1956 | Patton | 307—88.5 |
| 2,924,967 | 2/1960 | Gieseler | 332—47 |
| 3,035,215 | 5/1962 | De Viney | 307—88.5 |
| 3,109,939 | 11/1963 | Chin et al. | 307—88.5 |

ARTHUR GAUSS, *Primary Examiner.*

R. H. EPSTEIN, *Assistant Examiner.*